United States Patent
Ahn

(10) Patent No.: US 7,614,778 B2
(45) Date of Patent: Nov. 10, 2009

(54) BACKLIGHT UNIT AND DRIVING METHOD THEREOF, AND LIQUID CRYSTAL DISPLAY DEVICE HAVING THE BACKLIGHT UNIT

(75) Inventor: Byeong Hyeon Ahn, Gumi-si (KR)

(73) Assignee: LG. Display Co., Ltd., Seoul (KR)

(*) Notice: Subject to any disclaimer, the term of this patent is extended or adjusted under 35 U.S.C. 154(b) by 70 days.

(21) Appl. No.: 11/635,363

(22) Filed: Dec. 7, 2006

(65) Prior Publication Data
US 2008/0002424 A1 Jan. 3, 2008

(30) Foreign Application Priority Data
Jun. 30, 2006 (KR) ............... 10-2006-0060315

(51) Int. Cl.
*F21V 8/00* (2006.01)
(52) U.S. Cl. .............. 362/631; 362/555; 362/561; 362/612; 362/630
(58) Field of Classification Search ........... 362/555, 362/561, 612, 630, 631
See application file for complete search history.

(56) References Cited

U.S. PATENT DOCUMENTS

| 2004/0105264 A1* | 6/2004 | Spero | 362/276 |
| 2005/0073495 A1* | 4/2005 | Harbers et al. | 345/102 |
| 2006/0120082 A1* | 6/2006 | Choo et al. | 362/276 |

* cited by examiner

*Primary Examiner*—Sandra L O'Shea
*Assistant Examiner*—Meghan K Dunwiddie
(74) *Attorney, Agent, or Firm*—Brinks Hofer Gilson & Lione

(57) ABSTRACT

A liquid crystal display device, backlight unit, and method of driving a backlight unit are provided. The backlight includes a lamp and an inverter that is operative to supply a driving voltage to the lamp. An illuminance correction system is operative to sense a surrounding luminance of the lamp and to illuminate a predetermined amount of light.

23 Claims, 4 Drawing Sheets

BACKLIGHT UNIT AND DRIVING METHOD THEREOF, AND LIQUID CRYSTAL DISPLAY DEVICE HAVING THE BACKLIGHT UNIT

This patent document claims the benefit of Korean Patent Application No. P06-60315 filed on Jun. 30, 2006, which is hereby incorporated by reference.

BACKGROUND

1. Field

The present embodiments relate to a backlight unit and driving method thereof, and a liquid crystal display device having the backlight unit.

2. Related Art

A liquid crystal display (LCD) device has been used in various applications including notebook computers, personal computers (PC), television monitors, and the like. The LCD device has a small volume, is lightweight and has low power consumption characteristics.

The LCD device is a light receiving device that displays an image by adjusting the amount of light incident from an outside light source. Accordingly, the LCD device needs a backlight unit for illuminating light into an LCD panel.

Generally, backlight units are classified into edge type backlight units and direct type backlight units depending on the arrangement of the light source. The edge type backlight unit has a light source arranged on a side of the LCD device and a light guide plate disposed on a rear of the LCD panel. The light guide plate guides the light emitted from the side toward a front surface of the LCD panel. The direct type backlight unit has a plurality of light sources arranged on the rear of the LCD panel. The light emitted from the plurality of light sources is directly illuminated into the LCD panel.

The light sources used for those backlight units include lamps, for example, an electro luminescence (EL), a cold cathode fluorescent lamp (CCFL), and a hot cathode fluorescent lamp (HCFL), and a light emitting diode (LED).

Typically, the lamps include a glass tube, an inert gas filled in the glass tube, for example, Ar, Ne, or the like, a phosphor coated on an inner wall of the glass tube, and an electrode that supplies a voltage to an inside or an outside of the glass tube.

In the above lamps, when a voltage is applied to the electrode, electrons emit from the electrode, collide with the inert gas to emit UV rays, and the UV rays collide with the phosphor coated on the inner wall of the glass tube to emit visible rays.

In a dark state, which does not have an external illumination, the inert gases colliding with the electrons in the lamp are excited (or ionized) with a time delay.

The related art LCD device has a problem that the quality of an image displayed in an initial stage is deteriorated due to the delay in the excitation time of the inert gases when the lamp is driven in a dark state, especially in a low temperature state.

SUMMARY The present embodiments may obviate one or more problems due to limitations and disadvantages of the related art. For example, in one embodiment, a backlight unit and driving method thereof can stably drive a light source by providing a minimal illuminance.

In one embodiment, a backlight unit includes a lamp and an inverter that supplies a driving voltage to the lamp. An illuminance correction system senses a surrounding luminance of the lamp to illuminate a predetermined amount of light.

In one embodiment, a liquid crystal display device includes an illuminance correction system that senses a surrounding illuminance of a lamp to illuminate a predetermined amount of light. A liquid crystal display panel displays an image using the light emitted from the lamp.

In another embodiment, a method of driving a backlight unit includes sensing a surrounding illuminance of a lamp at a light sensor; comparing the surrounding illuminance sensed by the light sensor with a preset reference illuminance (1 lx); generating On/Off control signal of a light emitting device according to a result of the comparing; and driving or stopping the light emitting device according to the On/Off control signal.

It is to be understood that both the foregoing general description and the following detailed description of the present invention are exemplary and explanatory and are intended to provide further explanation of the invention as claimed.

DETAILED DESCRIPTION

Figure 1:
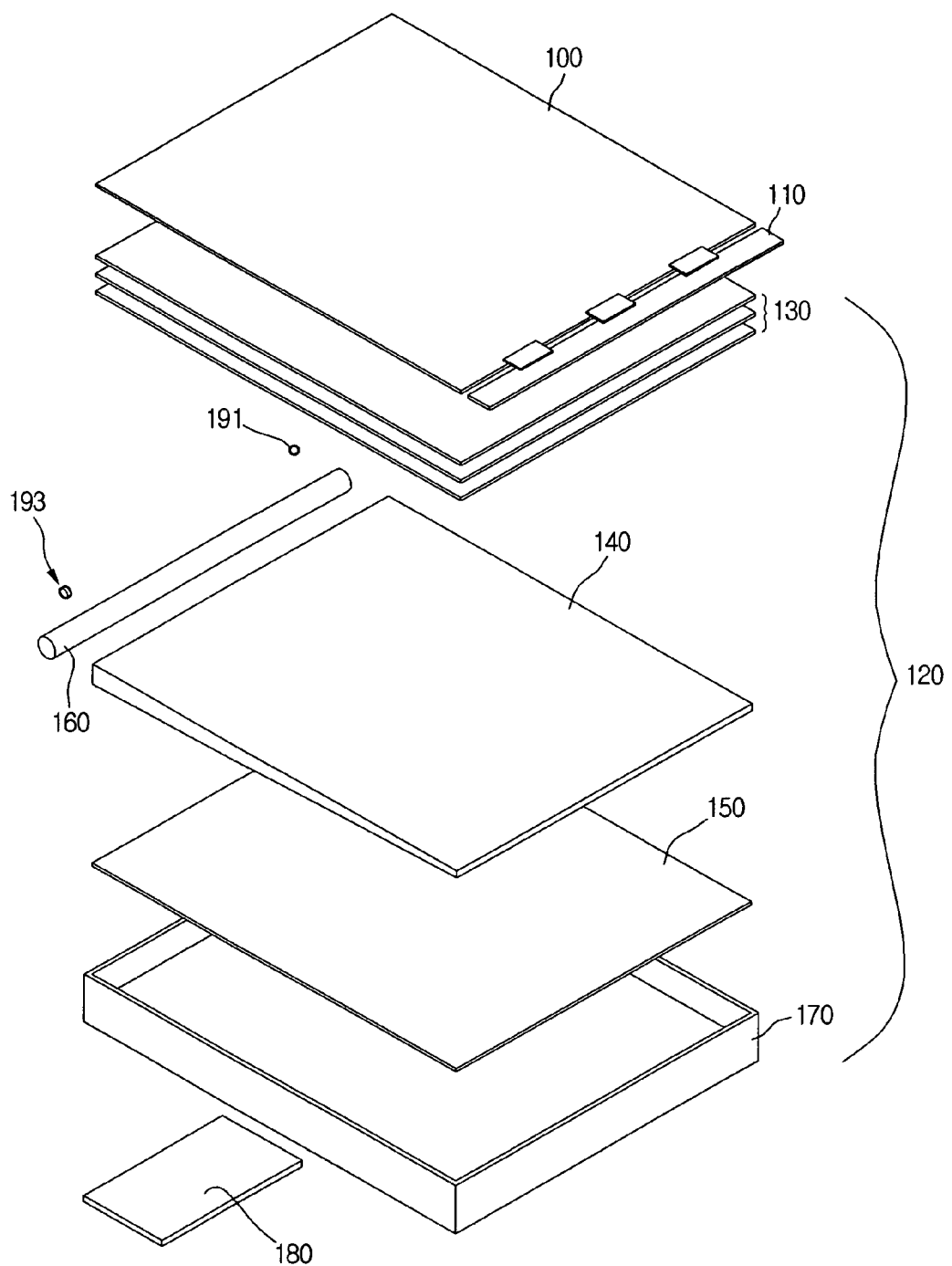
FIG. 1 is a perspective view of one embodiment of a liquid crystal display device.

In one embodiment, as shown in FIG. 1, a liquid crystal display device includes a liquid crystal display panel 100 that displays an image, a liquid crystal display panel driver 110 that drives the liquid crystal display panel 100, and a backlight unit 120 that provides light to the liquid crystal display panel 100.

The liquid crystal display panel 100 includes a thin film transistor array substrate and a color filter substrate that face each other and are attached to each other so as to maintain a uniform cell gap. A liquid crystal layer is interposed between the thin film transistor substrate and the color filter substrate.

The backlight unit 120 includes a bottom case 170, a reflection plate attached or deposited on an entire inner surface of the bottom case 170. A lamp 160 is disposed at a side of the bottom case 170. A light guide plate 140 is disposed so as to form a single plane with the lamp 160 and convert linear light into a surface light. An optical sheet 130 is disposed on the light guide plate 140 to diffuse and focus light.

The backlight unit 120 further includes a backlight driver 180 that drives the lamp 160.

In one embodiment, a light sensor 191 senses an inner illuminance of the backlight unit 120 that is disposed around the lamp 160. A light emitting device 193 is driven by an illuminance correction controller (not shown) according to the sensed illuminance is disposed.

The present embodiments are not limited to the light sensor 191 and the light emitting device 193 being one, as shown in FIG. 1. For example, the light sensor 191 and the light emitting device 193 may be in plurality.

The "illuminance" represents an amount of light which a surface receives for a predetermined time. The unit of the illuminance is Lux and expressed as 'lx'. For example, 1 lx is an illuminance value of when a luminous flux of 1 lm (lumen) per square meter is uniformly illuminated.

In one exemplary embodiment, the light sensor 191 includes a photodiode or a thin film transistor. In one exemplary embodiment, the light emitting device 193 includes a light emitting diode (LED).

In one embodiment, the backlight driver 180 includes an inverter (not shown) disposed on a rear of the bottom case 170 to drive the lamp 160. An illuminance correction controller (not shown) controls the light sensor 191 and the light emitting device 193 so as to provide a predetermined amount of light to a surrounding of the lamp 160 according to the illuminance.

In one embodiment, an illuminance correction system includes the light sensor 191, the light emitting device 193 and the illuminance correction controller.

In one embodiment, the light sensor 191 senses the illuminance around the lamp 160. The illuminance correction controller drives the light emitting device 193 to increase the illuminance when the illuminance sensed by the light sensor 191 is less than the reference illuminance (i.e. 1 lx). When the lamp 160 is driven by the inverter, the illuminance correction controller stops driving the light emitting device 193.

The stopping of the driving of the light emitting device 193 during the driving of the lamp 160 is to prevent the imbalance in luminance that may be generated when the liquid crystal display device is driven by the light emitting from the light emitting device 193.

The illuminance correction system will be described later in detail with reference to the block diagram of FIG. 2.

In one embodiment, the liquid crystal display device employs the edge type backlight unit in which the lamp 160 is disposed at a side thereof. However, the present embodiments are not limited to an edge type backlight unit in which the lamp 160 is disposed at a side thereof. For example, a direct type backlight unit with a plurality of lamps disposed on an inner entire surface of the bottom case 170 can be utilized.

In one embodiment, the liquid crystal display device includes at least one light sensor 191 disposed around the lamp 160 to sense the illuminance around the lamp 160. The at least one light sensor 191 provides a predetermined amount of light in an environment (i.e. dark state) where the surrounding luminance is low, to secure an environment for the stable driving of the lamp 160, thereby improving the display quality.

Figure 2:
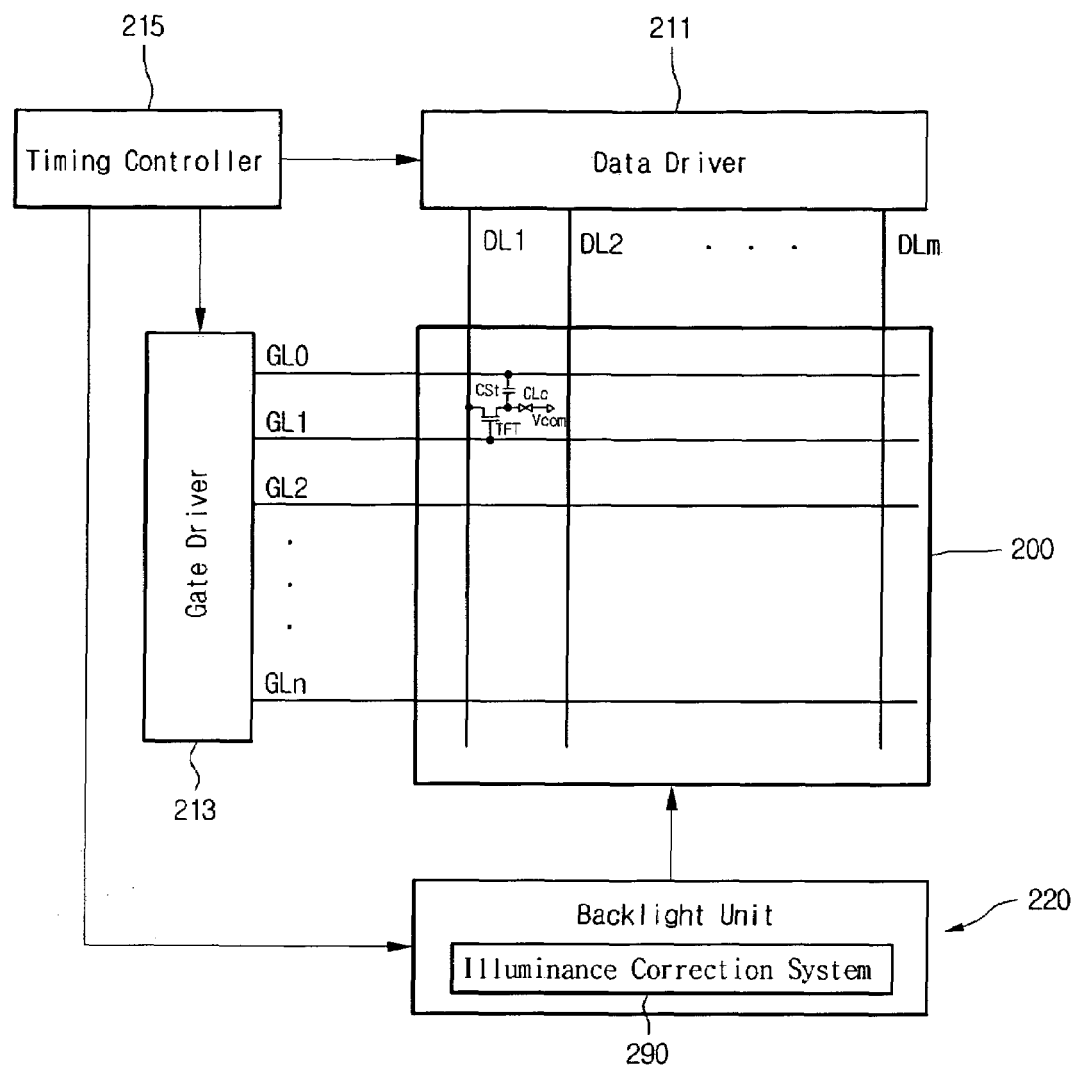
FIG. 2 is a block diagram of one embodiment of the liquid crystal display device of FIG. 1.
Figure 3:
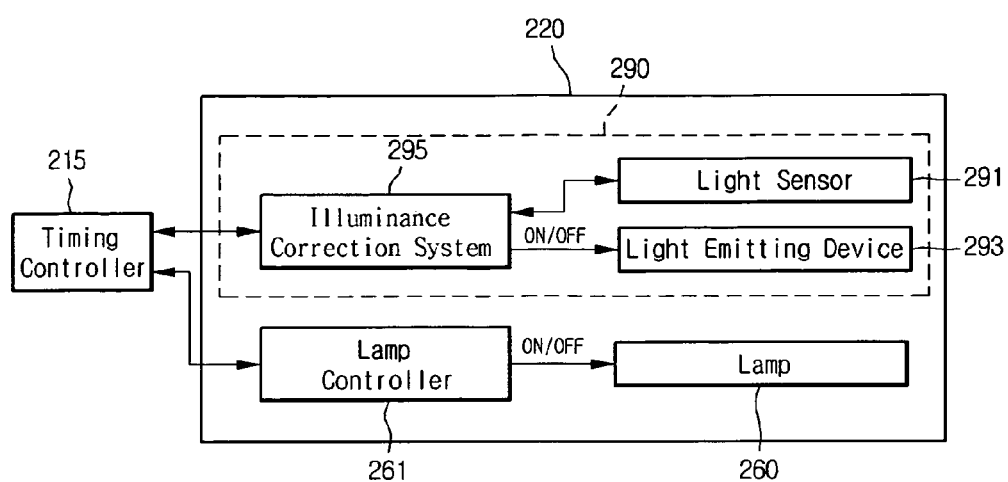
FIG. 3 is a block diagram of one embodiment of the backlight unit of FIG. 2.

In one embodiment, as shown in FIGS. 2 and 3, a liquid crystal display device includes a liquid crystal display panel 200 having a plurality of gate lines GL1 to GLn and a plurality of data lines DL1 to DLm arranged therein. A gate driver 213 and a data driver 211 drive the liquid crystal display panel 200. A backlight unit 220 illuminates a generated light to the liquid crystal display panel 200. A timing controller 215 controls the gate driver 213, the data driver 211 and the backlight unit 220.

The liquid crystal display panel 200 also has a thin film transistor TFT formed at a crossing point of the plurality of gate lines GL1 to GLn and the plurality of data lines DL1 to DLm.

The gate driver 213 provides the plurality of gate lines GL1 to GLn with a scan signal, i.e., gate high voltage VGH according to a gate control signal generated from the timing controller 215.

In one embodiment, the data driver 211 provides the plurality of data lines DL1 to DLm with a data voltage according to a data control signal generated from the timing controller 215. In another embodiment, the data driver 211 converts red, green and blue data inputted from the timing controller 215 into an analog data voltage.

The timing controller 215 generates the gate control signal using vertical/horizontal synchronous signal Vsync/Hsync, data enable signal DE and clock signal, and also generates the data control signal that controls the data driver 211.

In one embodiment, the backlight unit 220 generates a light to be illuminated to the liquid crystal display panel 200, and the driving of the backlight unit 220 is controlled by a control signal generated by the timing controller 215.

The backlight unit 220 includes an illuminance correction system 290 that stabalizes the driving of the lamp 260 according to the illuminance.

The illuminance correction system 290 includes a light sensor 291 that senses an inner illuminance of the backlight unit 200. A light emitting device emits light according to the illuminance sensed by the light sensor 291. An illuminance correction controller 295 controls the light sensor 291 and the light emitting device 293.

In one embodiment, the light sensor 291 is disposed inside the backlight unit 220 to sense the inner illuminance of the backlight unit 220. However, the light sensor 291 is not limited to this location. For example, the light sensor 291 may be disposed outside the backlight unit 220 or any suitable location. The light sensor 291 can be comprised of a photodiode or a thin film transistor TFT responding to light.

In one embodiment, the photodiode is an opto-electronic conversion device. When a contact between a metal and a semiconductor showing p-n junction or rectifier characteristic is made in the electronic conversion device, a reverse current is increased due to a photovoltaic effect by light, and the electronic conversion device functions to sense a fine light inside the backlight unit 220.

In one embodiment, the light sensor 291 supplies a signal sensed, which is based on the amount of light inside the backlight unit 220, to the illuminance correction controller 295.

The illuminance correction controller 295 compares the signal inputted from the light sensor 291 with the reference illuminance (i.e. 1 lx), and when the input signal is less than the reference illuminance (1 lx), it provides ON control signal to the light emitting device 293, and when the input signal is equal to or higher than the reference illuminance, it provides OFF signal to the light emitting device 293.

In one embodiment, the light emitting device 293 emits light when the ON control signal is inputted from the illuminance correction controller 295. The light emitting device stops driving when the OFF control signal is inputted.

In one embodiment, the light emitting device 293 includes a light emitting diode (LED) that emits light. The light emitting device 293 is disposed around the lamp 260 to illuminate a light, thus improving an environment deteriorating the driving of the lamp 260, for example, dark state. In addition, the light emitting device 293 can improve a low temperature environment using a heat generated during the driving thereof.

In one embodiment, the illuminance correction controller 295 receives a lamp driving control signal generated from the timing controller 215 to generate OFF control signal for stopping the driving of the light emitting device 293 when the lamp 260 is driven by a lamp controller 299. Accordingly, when the lamp 260 is driven, the light emitting device 293 stops the driving by the OFF control signal inputted from the illuminance correction controller 295.

In one embodiment, the liquid crystal display device includes the illuminance correction system 290 inside the backlight unit 220, and the light sensor 291 sensing the illuminance around the lamp 260. When the sensed illuminance is less than the reference illuminance (1 lx), the liquid crystal display device drives the light emitting device 293. In this embodiment, a minimal environment in which the driving of the lamp 260 is stabilized, i.e., the illuminance above 1 lx and the inner temperature above 0° C.

Figure 4:
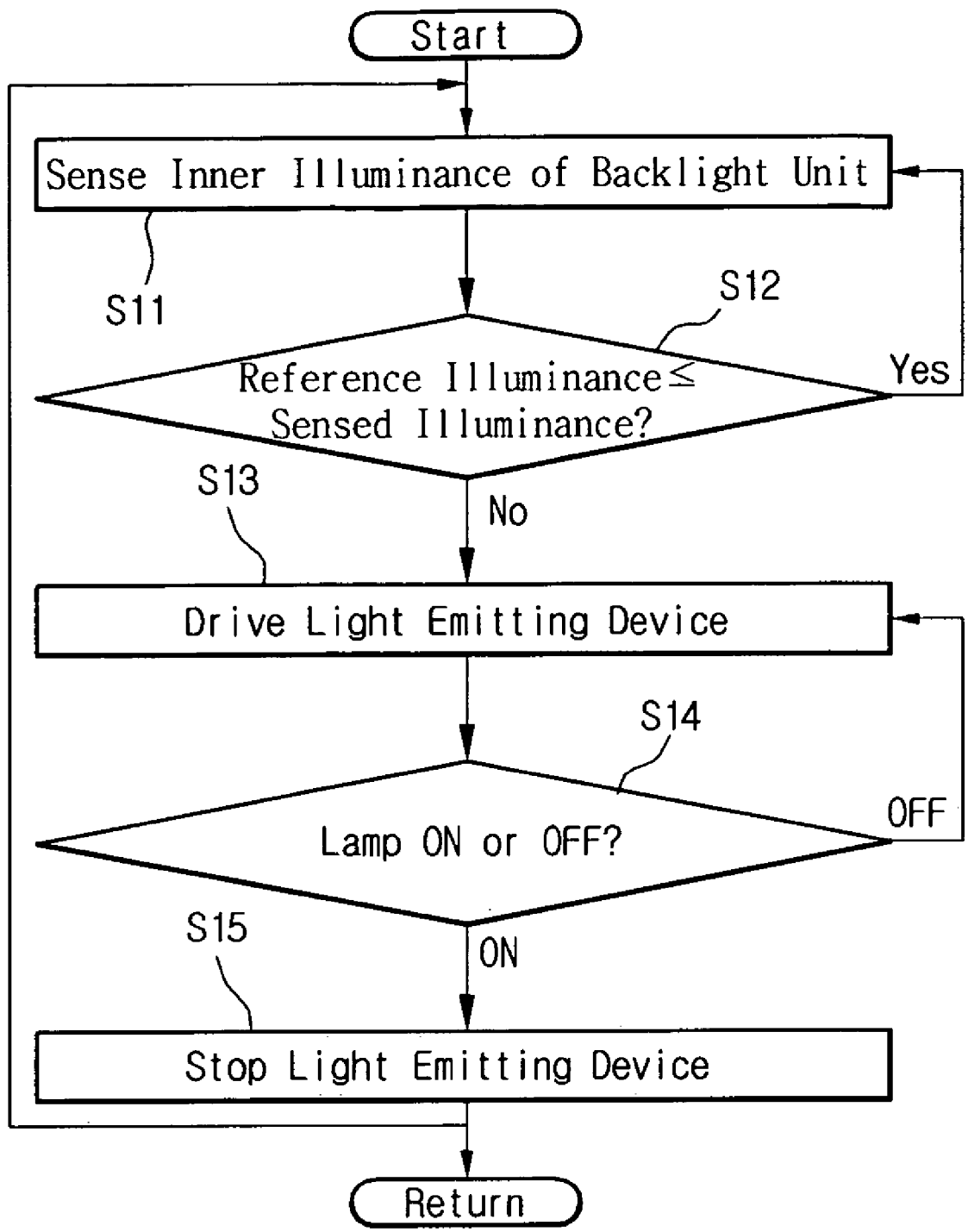
FIG. 4 is a flow chart showing one embodiment of a method of driving a liquid crystal display device.

In one embodiment, as shown in FIG. 4 and FIGS. 2 and 3, a method of driving a backlight unit includes using a light sensor 291 comprised of a photodiode or a thin film transistor to sense the amount (or illuminance) of light inside the backlight unit 220. The sensed illuminance is inputted into the illuminance correction controller 295 (S11).

In one embodiment, the illuminance correction controller 295 compares the sensed input illuminance with a reference illuminance (1 lx) according to the amount of light sensed by the light sensor 291 to generate a control signal (S12).

Although not shown in detail, the illuminance correction controller 295 outputs OFF control signal to the light emitting device 293 when the sensed illuminance is above the reference illuminance (1 lx). The light sensor 291 repetitively senses the inner illuminance of the backlight unit 220 and inputs the sensed illuminance into the illuminance correction controller 295.

Alternatively, when the sensed illuminance is less than the reference illuminance (1 lx), the illuminance correction controller 295 generates an ON control signal and the generated ON control signal is inputted into the light emitting device 293.

When the ON control signal is inputted into the light emitting device 293, the light emitting device 293 emits light (S13).

In one embodiment, it is determined whether or not the lamp 260 provided as the light source of the backlight unit 220 is being driven. When it is determined that the lamp 260 is driven, the illuminance correction controller 295 generates OFF control signal and inputs the generated OFF control signal into the light emitting device 293, but when it is determined that the lamp 260 is not being driven, the illuminance correction controller 295 compares the sensed illuminance with the reference illuminance (1 lx). When the sensed illuminance is less than the reference illuminance (1 lx), the illuminance correction controller 295 generates ON control signal and inputs the generated ON control signal into the light emitting device 293 (S14). When the lamp 260 is in OFF state, the illuminance correction controller 295 allows the light sensor to sense the inner illuminance of the backlight unit 220 to determine whether or not to drive the light emitting device 293.

In one embodiment, while the lamp 260 is being driven, the light emitting device 293 receives an OFF control signal according to the control signal generated from the illuminance correction controller 295 to stop the driving thereof (S15).

In the aforementioned driving method of the backlight unit according to one embodiment, after the driving of the lamp 260 stops, the steps S11 to S14 can be repeated.

In one embodiment, a liquid crystal display device includes the illuminance correction system 290 inside the backlight unit 220, and the light sensor 291 senses the illuminance around the lamp 260. When the sensed illuminance is less than the reference illuminance (1 lx), the liquid crystal display device drives the light emitting device 293, thus providing a minimal environment in which the driving of the lamp 260 is stabilized, i.e., the illuminance above 1 lx and the inner temperature above 0° C.

As described above, in one embodiment, the liquid crystal display device has the illuminance correction system inside the backlight unit, thus providing an ideal environment (illuminance above 1 lx) for the driving of the lamp and stably driving the lamp.

In one embodiment, the illuminance is above 1 lx and the inner temperature is above 0° C., thus improving the initial image quality during the driving of the liquid crystal display device and enhancing the yield of the liquid crystal display device.

It will be apparent to those skilled in the art that various modifications and variations of the present embodiments can be made. Thus, it is intended that the present invention covers the modifications and variations of this invention provided they come within the scope of the appended claims and their equivalents.

What is claimed is:

1. A backlight unit comprising:
   a lamp;
   an inverter that is operative to supply a driving voltage to the lamp; and
   an illuminance correction system that is operative to sense a surrounding luminance of the lamp and to illuminate a predetermined amount of light, the illuminance correction system comprising
   a light sensor, a light emitting device disposed around the lamp, and a controller that controls the light sensor and the light emitting device,
   wherein the light sensor senses the illuminance around the lamp,
   wherein the light emitting device emits light to secure an environment for the stable driving of the lamp and
   wherein the controller stops driving the light emitting device, when the lamp is driven by the inverter.

2. The backlight unit according to claim 1, wherein the light sensor is disposed in close proximity of the lamp.

3. The backlight unit according to claim 1, wherein the light sensor comprises a photodiode that is operative to sense light or a thin film transistor.

4. The backlight unit according to claim 1, wherein the light emitting device is disposed in proximity of the lamp.

5. The backlight unit according to claim 1, wherein the light emitting device comprises a tight emitting diode (LED).

6. The backlight unit according to claim 1, wherein the controller has a preset reference illuminance.

7. The backlight unit according to claim 6, wherein the present reference illuminance is set to 1 lx.

8. The backlight unit according to claim 6, wherein the controller is operatively coupled to compare the sensed surrounding illuminance with the reference illuminance.

9. The backlight unit according to claim 8, wherein the controller is operative to generate an ON control signal when the sensed surrounding illuminance is smaller than the reference illuminance, and generate an OFF control signal when the sensed surrounding illuminance is equal to or higher than the reference illuminance.

10. A liquid crystal display device comprising:
   an illuminance correction system that is operative to sense a surrounding illuminance of a lamp and emit a predetermined amount of light from the lamp; and
   a liquid crystal display panel displaying an image using the light emitted from the lamp,
   wherein the illuminance correction system comprises a light sensor, a light emitting device disposed around the lamp, and a controller that controls the light sensor and the light emitting device,
   wherein the light sensor senses the illuminance around the lamp, wherein the light emitting device emits light to secure an environment for the stable driving of the lamp and wherein the controller stops driving the light emitting device, when the lamp is driven by the inverter.

11. The liquid crystal display device according to claim 10, wherein the light sensor is disposed in close proximity of the lamp.

12. The liquid crystal display device according to claim 10, wherein the light sensor comprises a photodiode capable of sensing light or a thin film transistor.

13. The liquid crystal display device according to claim 10, wherein the light emitting device is disposed in close proximity of the lamp.

14. The liquid crystal display device according to claim 10, wherein the light emitting device comprises a light emitting diode (LED).

15. The liquid crystal display device according to claim 10, wherein the controller has a preset reference illuminance.

16. The liquid crystal display device according to claim 15, wherein the present reference illuminance is 1 lx.

17. The liquid crystal display device according to claim 16, wherein the controller is operatively coupled to compare the sensed surrounding illuminance with the reference illuminance.

18. The liquid crystal display device according to claim 17, wherein the controller is operative to generate an ON control signal when the sensed surrounding illuminance is smaller than the reference illuminance, and generate an OFF control signal when the sensed surrounding illuminance is equal to or higher than the reference illuminance.

19. A method of driving a backlight unit, the method comprising:

sensing a surrounding illuminance of a lamp;

comparing the surrounding illuminance with a preset reference illuminance;

generating an ON/OFF control signal of a light emitting device according to a result of the comparing; and driving or stopping the light emitting device according to the ON/OFF control signal, wherein the light emitting device is disposed around the lamp, wherein the light emitting device emits light to secure an environment for the stable driving of the lamp and wherein the controller stops driving the light emitting device when the lamp is driven by the inverter.

20. The method according to claim 19, wherein comparing the sensed surrounding iliuminance with the reference illuminance is performed by a controller.

21. The method according to claim 20, wherein the controller generates an ON control signal when the sensed surrounding illuminance is smaller than the reference illuminance, and generates OFF signal when the sensed surrounding illuminance is equal to or higher than the reference illuminance.

22. The method according to claim 19, wherein the controller generates an OFF control signal in a section where the lamp drives.

23. The method according to claim 19, wherein the preset reference illuminance is 1 lx.

* * * * *

UNITED STATES PATENT AND TRADEMARK OFFICE
CERTIFICATE OF CORRECTION

PATENT NO. : 7,614,778 B2 Page 1 of 1
APPLICATION NO. : 11/635363
DATED : November 10, 2009
INVENTOR(S) : Byeong Hyeon Ahn It is certified that error appears in the above-identified patent and that said Letters Patent is hereby corrected as shown below:

In the Claims

In column 6, claim 5, line 41, after "device comprises a" replace "tight" with --light--.

In column 8, claim 20, line 17, after "sensed surrounding" replace "iliuminance" with --illuminance--.

Signed and Sealed this

First Day of June, 2010

David J. Kappos
*Director of the United States Patent and Trademark Office*